United States Patent
Cotner et al.

(10) Patent No.: US 6,424,974 B1
(45) Date of Patent: Jul. 23, 2002

(54) STORING P-CODE IN A DATABASE

(75) Inventors: Curt L. Cotner, Gilroy, CA (US); Wendy Lynne Koontz, Denver, CO (US); Gerald H. Roth, San Jose, CA (US); Frederick Thomas Sharp, Menlo Park, CA (US); Shu-Huar Joseph Yeh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/928,620

(22) Filed: Sep. 12, 1997

Related U.S. Application Data

(63) Continuation-in-part of application No. 08/828,481, filed on Mar. 31, 1997, now Pat. No. 6,061,517, and a continuation-in-part of application No. 08/828,854, filed on Mar. 31, 1997, now Pat. No. 6,145,119, and a continuation-in-part of application No. 08/828,476, filed on Mar. 31, 1997, now Pat. No. 5,890,158, and a continuation-in-part of application No. 08/828,480, filed on Mar. 31, 1997, now Pat. No. 6,188,400, and a continuation-in-part of application No. 08/828,989, filed on Mar. 31, 1997, now Pat. No. 5,940,593, and a continuation-in-part of application No. 08/828,478, filed on Mar. 31, 1997, now Pat. No. 5,953,525, and a continuation-in-part of application No. 08/829,104, filed on Mar. 31, 1997, now Pat. No. 6,069,627, and a continuation-in-part of application No. 08/828,846, filed on Mar. 31, 1997, now Pat. No. 5,956,036, and a continuation-in-part of application No. 08/828,479, filed on Mar. 31, 1997, now Pat. No. 5,911,075, and a continuation-in-part of application No. 08/828,477, filed on Mar. 31, 1997, now Pat. No. 5,883,626, and a continuation-in-part of application No. 08/828,890, filed on Mar. 31, 1997, now Pat. No. 5,953,731, and a continuation-in-part of application No. 08/828,897, filed on Mar. 31, 1997, now Pat. No. 6,058,264, and a continuation-in-part of application No. 08/828,990, filed on Mar. 31, 1997, now Pat. No. 5,875,322.

(51) Int. Cl.$^7$ .............................................. G06F 17/00
(52) U.S. Cl. .................. 707/103 R; 707/103; 707/102; 709/319; 709/313
(58) Field of Search ................................ 395/704, 371; 707/3, 4, 1–206; 709/1–108, 310–332

(56) References Cited

U.S. PATENT DOCUMENTS

| | | | | |
|---|---|---|---|---|
| 5,602,982 A | * | 2/1997 | Judd et al. | 395/326 |
| 5,632,015 A | * | 5/1997 | Zimowski et al. | 707/3 |
| 5,675,804 A | * | 10/1997 | Sidik et al. | 395/705 |
| 5,742,810 A | * | 4/1998 | Ng et al. | 707/4 |
| 5,819,251 A | * | 10/1998 | Kremer et al. | 707/1 |
| 5,850,550 A | * | 12/1998 | Li et al. | 395/708 |
| 5,901,315 A | * | 5/1999 | Edwards et al. | 395/704 |

\* cited by examiner

*Primary Examiner*—David Jung
(74) *Attorney, Agent, or Firm*—Gates & Cooper LLP

(57) ABSTRACT

A method, apparatus, and article of manufacture for providing a programming development environment that supports the development of portable server routines. More specifically, the present invention discloses a method for storing and retrieving server routines within the database independent of any file I/O system. Also, the present invention discloses a debugging environment that allows debugging of server routines in a multi-tier environment, wherein the source code being debugged runs on the development machine.

13 Claims, 6 Drawing Sheets

STORING P-CODE IN A DATABASE

RELATED APPLICATIONS

This application is also a continuation-in-part of the following co-pending and commonly-assigned applications:

Application Ser. No. 08/828,481, entitled "MULTI-TIER DEBUGGING," filed Mar. 31, 1997, by Daniel E. House and Constance J. Nelin, now U.S. Pat. No. 6,016,517, issued May 9, 2000, attorney's docket number ST997036;

Application Ser. No. 08/828,854, entitled "PROGRAMMING DEVELOPMENT ENVIRONMENT FOR INTRANET AND INTERNET APPLICATIONS EMPLOYING UNIQUE PROJECT DATA STRUCTURE," filed Mar. 31, 1997, by Daniel E. House, Brian J. Owings, and Shiau-Shiau Pei, now U.S. Pat. No. 6,145,119, issued Nov. 9, 2000, attorney's docket number ST997027;

Application Ser. No. 08/828,476, entitled "METHOD, APPARATUS AND PROGRAM STORAGE DEVICE FOR SHARING OBJECTS WITH A NETWORK SERVER AND A DATABASE SERVER USING A COMMON OBJECT MODEL" filed Mar. 31, 1997, by Daniel E. House, Brian J. Owings, and Shiau-Shiau Pei, now U.S. Pat. No. 5,890,158, issued Mar. 30, 1999, attorney's docket number ST997035;

Application Ser. No. 08/828,480, entitled "REMOTE SCRIPTING OF LOCAL OBJECTS," filed Mar. 31, 1997, by Daniel E. House, Constance J. Nelin, and Rebecca B. Nin, now U.S. Pat. No. 6,188,400, issued Feb. 13, 2001, attorney's docket number ST997020;

Application Ser. No. 08/828,989, entitled "SIMULATING A MULTI-TIERED COMPUTER ENVIRONMENT ON A SINGLE DEVELOPMENT SYSTEM FOR DEBUGGING," filed Mar. 31, 1997, by Daniel E. House and Constance J. Nelin, now U.S. Pat. No. 5,940,593, issued Aug. 17, 1999, attorney's docket number ST997021;

Application Ser. No. 08/828,478, entitled "MULTI-TIER VIEW PROJECT WINDOW," filed Mar. 31, 1997, by Howard J. Glaser, Daniel E. House, and Constance J. Nelin, now U.S. Pat. No. 5,953,525, issued Sep. 14, 1999, attorney's docket number ST997022;

Application Ser. No. 08/829,104, entitled "EXTENDER USER INTERFACE," filed Mar. 31, 1997, by Thomas E. Conrad, Howard J. Glaser, Jean C. Ho, James L. Keesey, Constance J. Nelin, and Gerald J. Wilmot, now U.S. Pat. No. 6,069,627, issued May 30, 2000, attorney's docket number ST997913;

Application Ser. No. 08/828,846, entitled "SHARED MODULES GRAPHICAL USER INTERFACE," filed Mar. 31, 1997, by Howard J. Glaser, Daniel E. House, and Constance J. Nelin, now U.S. Pat. No. 5,956,036, issued Sep. 21, 1999, attorney's docket number ST997025;

Application Ser. No. 08/828,479, entitled "QUERY SELECTION FOR A PROGRAM DEVELOPMENT ENVIRONMENT," filed Mar. 31, 1997, by Howard J. Glaser and Mary C. Lehner, now U.S. Pat. No. 5,911,075, issued Jun. 8, 1999, attorney's docket number ST997040;

Application Ser. No. 08/828,477, entitled "DOCKING AND FLOATING MENU/TOOL BAR," filed Mar. 31, 1997, by Howard J. Glaser, Karl D. Johnson and Stewart E. Nickolas, now U.S. Pat. No. 5,883,626, issued Mar. 16, 1999, attorney's docket number ST997038;

Application Ser. No. 08/828,890, entitled "HTML INTEGRATION UTILITY FOR A PROGRAM DEVELOPMENT ENVIRONMENT," filed Mar. 31, 1997, by Howard J. Glaser, now U.S. Pat. No. 5,953,731, issued Sep. 14, 1999, attorney's docket number ST997028;

Application Ser. No. 08/828,897, entitled "EXTENDER SMART GUIDE FOR CREATING AND MODIFYING EXTENDERS," filed Mar. 31, 1997, by Howard J. Glaser, now U.S. Pat. No. 6,058,264, issued May 2, 2000, attorney's docket number ST997026; and Application Ser. No. 08/828,990, entitled "MAKING A CONTROL AVAILABLE TO A COMPUTER WITHOUT INSTALLING THE CONTROL," filed Mar. 31, 1997, by Daniel E. House and Constance J. Nelin, now U.S. Pat. No. 5,875,322, issued Feb. 23, 1999, attorney's docket number ST997037;

all of which applications are incorporated by reference herein.

This application is also related to the following co-pending and commonly-assigned patent application:

Application Ser. No. 08/928,621 entitled "DYNAMICALLY DEBUGGING USER-DEFINED FUNCTIONS AND STORED PROCEDURES," filed on Sep. 12, 1997, by Constance J. Nelin, Gerald H. Roth, Frederick T. Sharp and Shu-Huar J. Yeh, now U.S. Pat. No. 6,253,368, issued Jun. 26, 2001, attorney's docket number ST997053, which application is incorporated by reference herein.

BACKGROUND OF THE INVENTION

1. Field of the Invention

This invention relates in general to computer programming development environments, and in particular, to a programming development environment that stores P-code for server routines in a database.

2. Description of Related Art

With the fast growing popularity of the Internet and Intranet, especially Web-based networks, there is also a fast growing demand for Internet and Intranet access to databases. However, it is especially difficult to use relational database management system (RDBMS) software with Web-based networks. One of the problems with using RDBMS software with Web-based networks is the lack of programming development environments that can be used to develop both Web-based and RDBMS-based applications.

For example, Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

In contrast, most RDBMS software uses a Structured Query Language (SQL) interface. The SQL interface has evolved into a standard language for RDBMS software and has been adopted as such by both the American National Standards Institute (ANSI) and the International Standards Organization (ISO). There are Stored Procedures (SP) and User Defined Functions (UDF) that can be performed by a RDBMS. These SPs and UDFs, commonly referred to as server routines, could be stored directly on a database server file system. As a result, the developed server routines could be operating system dependent. This dependency requires the server routine code to change across databases running on different operating systems.

For example, current development environments generate multiple files for accessing the server routines. Storing and accessing these files require file input/output (file I/O) operations. Because file I/O is operating system dependent, the code for the server routines has to change when porting from one hardware platform to another. Moreover, a security authorization independent from the database security authorization is required when a user wants to remove the code. This can complicate management and maintenance of a server routine.

Therefore, there is a need in the art for multi-tier development environments that are capable of developing server routines which are portable from one hardware platform to another.

SUMMARY OF THE INVENTION

To overcome the limitations in the prior art described above, and to overcome other limitations that will become apparent upon reading and understanding the present specification, the present invention discloses a method, apparatus, and article of manufacture for providing a programming development environment that supports the development of portable server routines. More specifically, the present invention discloses a method, apparatus, and article of manufacture for storing and retrieving server routines within the database independent of the file I/O system. Moreover, the development environment allows debugging of server routines in a multi-tier environment, wherein the source code being debugged runs on the development machine.

The method comprises the steps of storing the server routines in a RDBMS table accessible by a computer program, storing a pointer or a key to the table, retrieving the server routine from the table maintained within the database via the pointer or key, and executing the server routine.

The server routines stored in a table are easier to maintain and manage. They are backed up along with the rest of the database, and are easier to remove, especially, across databases running on different operating systems.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a three tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. The applications constructed using the RAD tool are primarily oriented towards data access, data manipulation and data rendering, especially in conjunction with relational database management systems (RDBMS).

Hardware Environment

Figure 1:
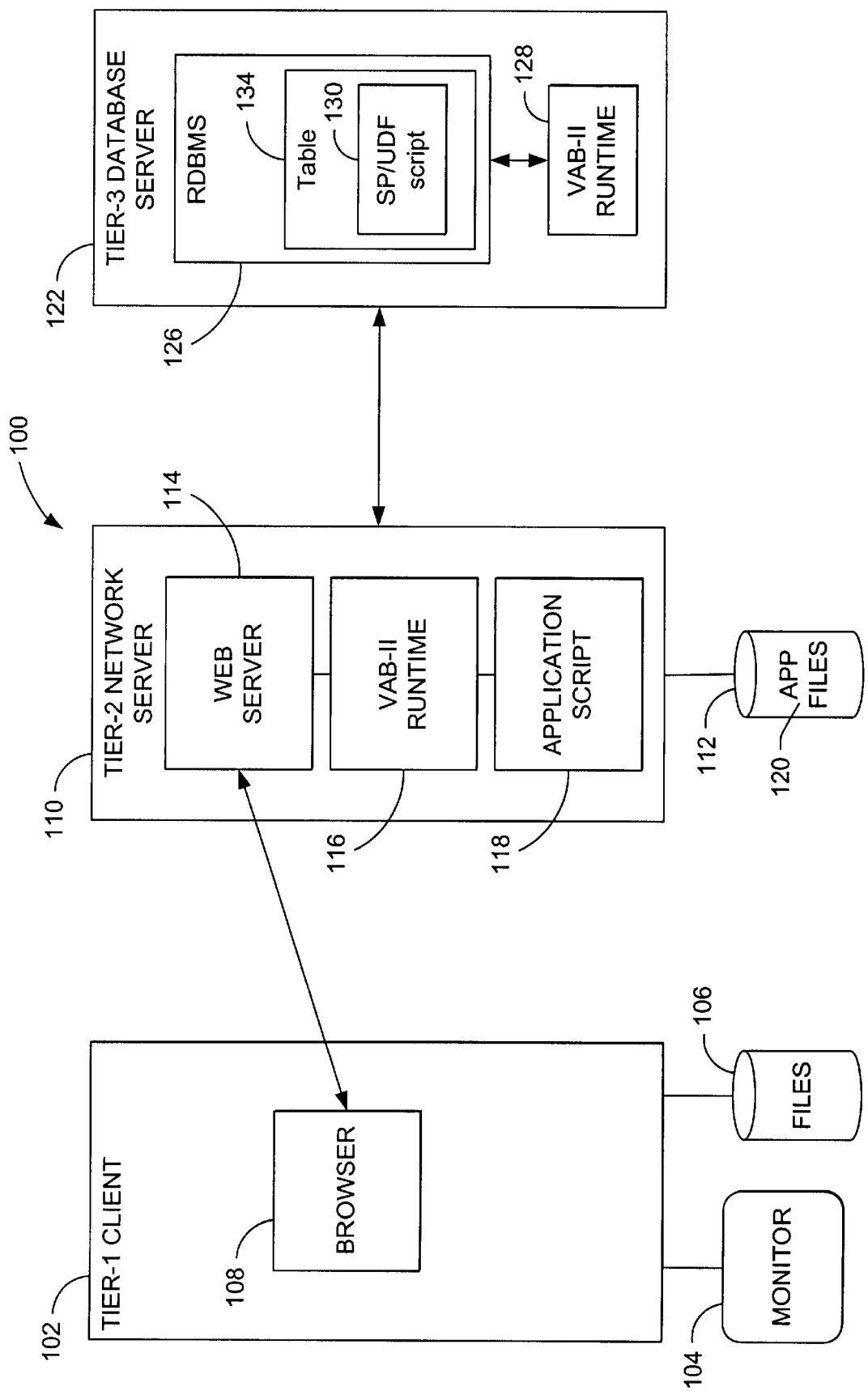
FIG. 1 is a block diagram that illustrates the three tier architecture of the present invention.

FIG. 1 is a block diagram that illustrates the three tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and one or more data storage devices 106. In the preferred embodiment, the client computer 102 executes a browser 108 capable of containing and executing applets, such as Microsoft Internet Explorer or Netscape Navigator. The browser 108 communicates with programs on other tiers through HTTP (Hypertext Transfer Protocol).

The second tier comprises a network server 110 having one or more data storage devices 112. In the preferred embodiment, the network server 110 executes a plurality of computer programs including a web server 114, a persistent VAB-II runtime module 116, and one or more application scripts 118 retrieved from an APP file 120 stored on a data storage device 112. The web server 114 (such as IBM, Microsoft, or Netscape HTTP daemons) communicates with the browser 108 and the third tier via HTTP. The VAB-II runtime module 116 executes the application scripts 118 and communicates with the third tier. The application scripts 118 (such as Lotus Script scripts) can contain programming logic for communicating with both the browser 108 and the third tier. Preferably, the application scripts 118 include Basic programming instructions, Java, ActiveX, or DLL applet controls, embedded SQL, and other mechanisms known in the art.

The third tier comprises a database server 122 having one or more tables 134. In the preferred embodiment, the database server executes a plurality of computer programs including a relational database management system (RDBMS) 126, a persistent VAB-II runtime module 128, and Stored Procedure (SP) and User Defined Function (UDF) scripts 130 retrieved from a table 134 maintained within the RDBMS 126. The SP/UDFs can be stored in the form of P-code or source files. P-code is an optimized intermediate code for an interpreter and runs faster and more safely than interpreting and running the source code. Also, running P-code for a server routine allows encapsulation of database authorization for embedded static SQL statements. Embedded static SQL statements in a program are prepared during program preparation process before the program is executed. The RDBMS 126 (such as IBM's DB2 product) receives requests either directly from tier-2 and/or indirectly from tier-2 via the VAB-II runtime module 128, and then performs the desired database functions. The VAB-II runtime module 128 executes the SP/UDF P-code or source code (the SP/UDF scripts 130). The SP/UDF scripts 130 comprise programming logic for accessing the database via the RDBMS 126 and communicating with the tier-2 computer programs.

Figure 2:
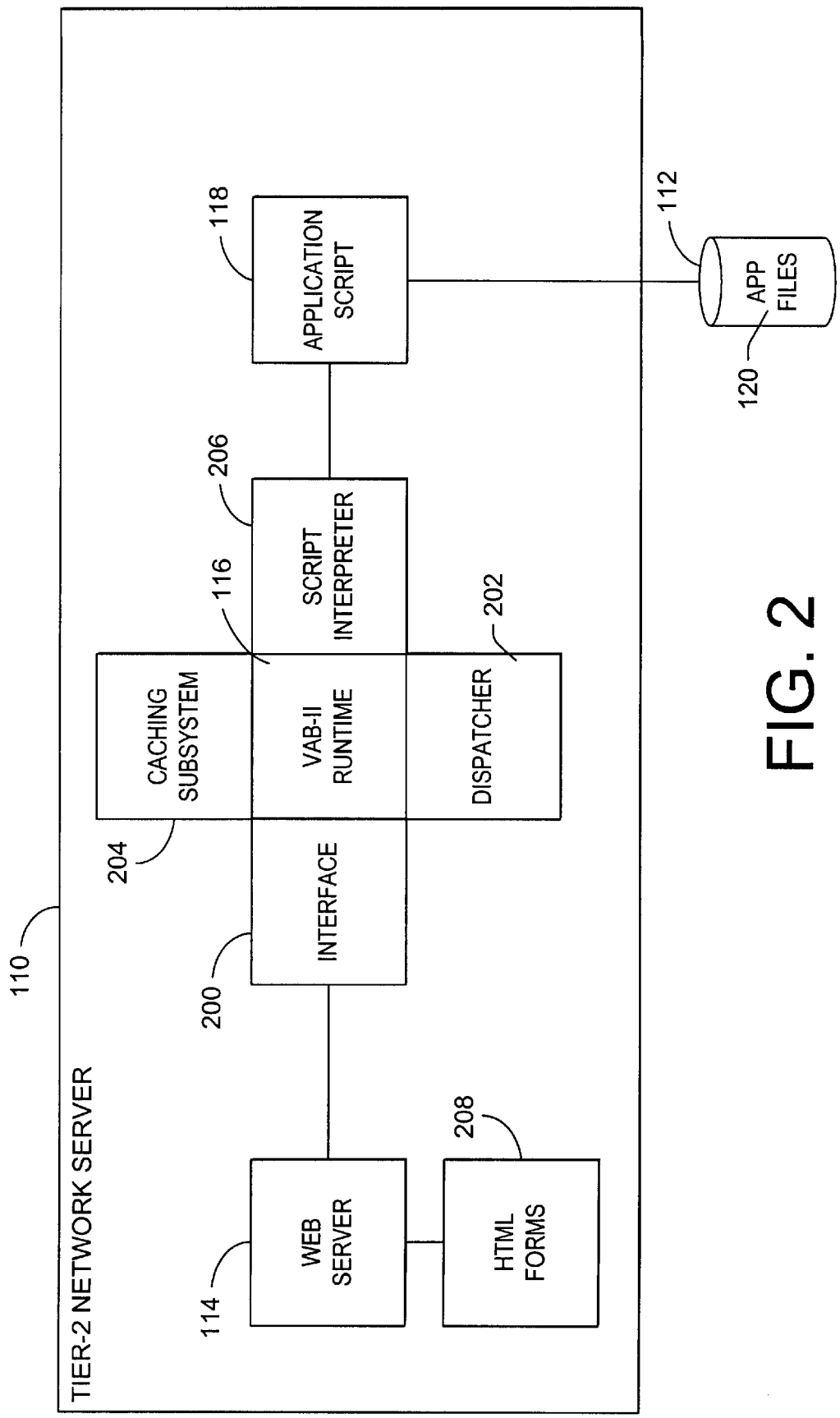
FIG. 2 is a block diagram that further illustrates the components of the network server in the present invention.

FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), Netscape Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112.

Figure 3:
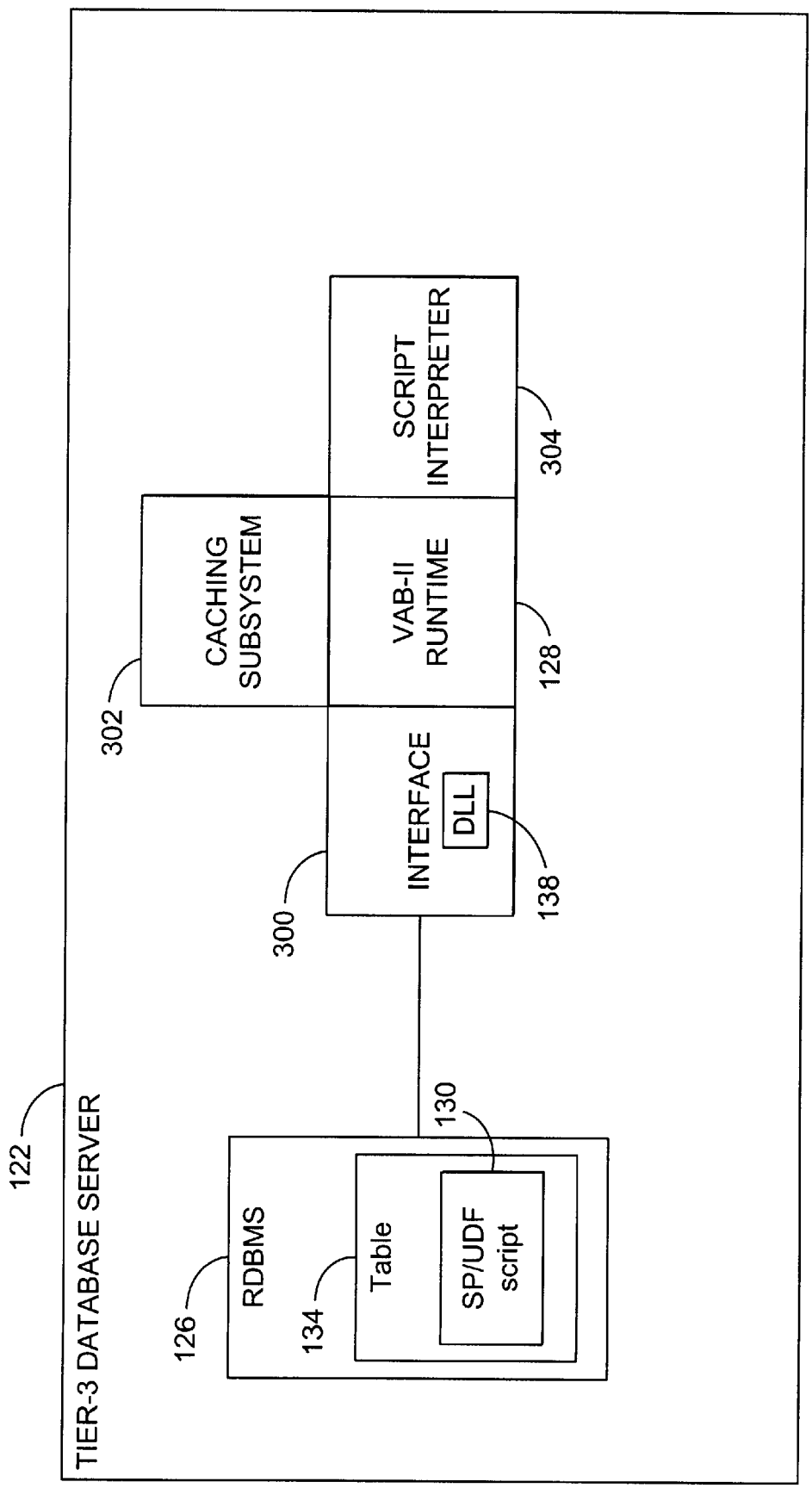
FIG. 3 is a block diagram that further illustrates the components of the database server in the present invention.

FIG. 3 is a block diagram that further illustrates the components of the database server 122 in the present invention. The VAB-II runtime module 128, for example, includes an interface 300 to the RDBMS 126, a caching subsystem 302, and a script interpreter 304 for executing one or more SP/UDF scripts 130 in the form of P-code or source code retrieved from a table 134 maintained within the RDBMS, independent of file I/O system. No dispatcher is required for the VAB-II runtime module 128 in the database server 122. The interface 300 provides a mechanism for executing the SP/UDF script 130 stored in the table 134 via a dynamic link library (DLL) 138 or some other protocol. As in the network server 110, the caching subsystem 302 exists to help manage special purpose object persistence, although SP/UDF scripts 130 are generally not persistent. The script interpreter 304 executes the P-code or source code for the SP/UDF script 130 retrieved from the table 134 maintained within the RDBMS, independent of file I/O system. The code in this table is backed up along with the rest of the database and can be easily removed across databases running on different operating systems.

As indicated above, the computer programs of the three tiers shown may be executed on separate computer hardware platforms or on a single computer hardware platform 134 or in some combination thereof. Each of the computers may include, inter alia, one or more processors, memory, keyboard, or display, and may be connected locally or remotely to fixed and/or removable data storage devices and/or data communications devices. Each of the computers in each of the tiers also could be connected to other computers via the data communications devices.

Development Environment

Figure 4:
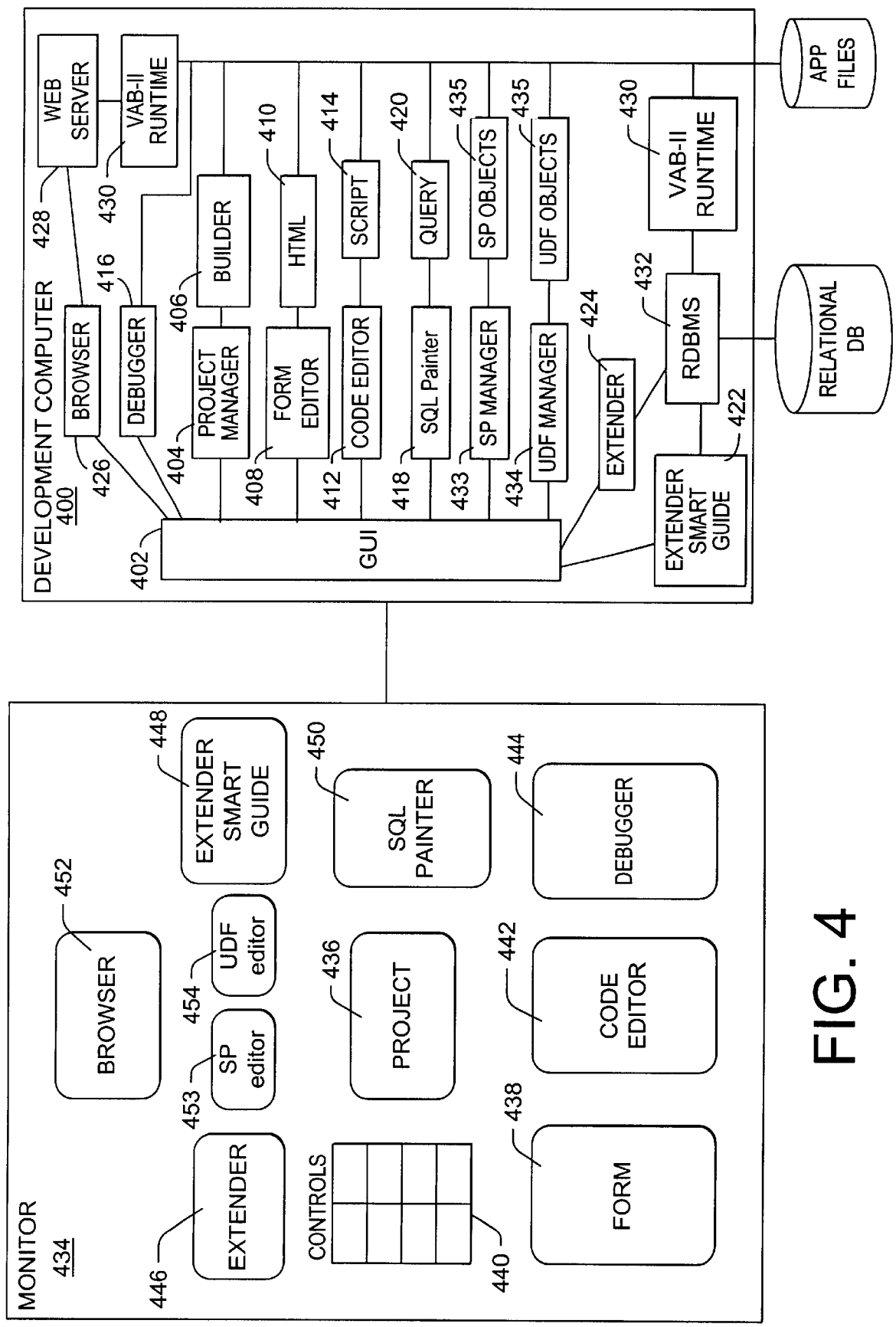
FIG. 4 is a block diagram that illustrates the development environment of the present invention.

FIG. 4 is a block diagram that illustrates the development environment of the present invention. A development computer 400 executes a Rapid Application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, RDBMS 432, SP manager 433 for constructing SP objects 435, and UDF manager 434 for constructing UDF objects 436. The RAD tool displays a user interface on a monitor 434 attached to the development computer 400, which includes, inter alia, a project window 436, form editor window 438, control pad 440, code editor window 442, debugging window 444, extender user interface window 446, extender guide window 448, SQL painter window 450, as well as a browser window 452, a SP editor 453, and UDF editor 454.

As described above, the present invention is typically implemented using a plurality of computer programs, each of which executes under the control of an operating system, such as OS/2, Windows, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Multi-Tier Debugging

Figure 5:
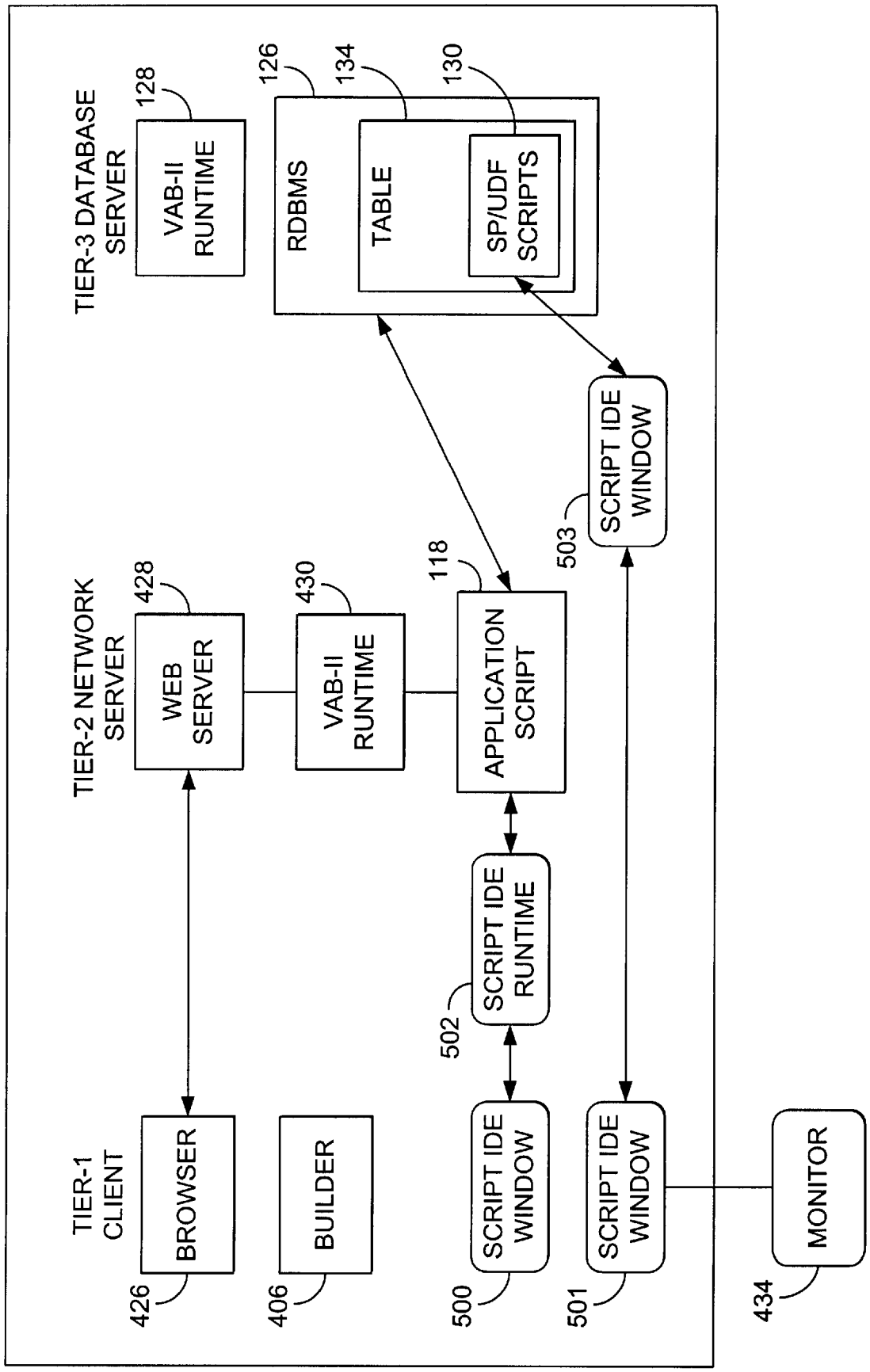
FIG. 5 is a block diagram that illustrates the multi-tier nature of the debugger executed by the development computer according to the present invention.

FIG. 5 is a block diagram that further illustrates the multi-tier nature of the debugger 444 executed by the development computer 400 according to the present invention. The present invention allows the debugging of multiple tiers at the same time, when the tiers are on separate machines or when the tiers are on a single machine. The debugger 444 uses a debug facility from the Lotus Script Integrated Development Environment (IDE), but splits the debug facility into a window or graphical user interface module 500 and a runtime module 502.

As indicated above, the programming logic in the present invention runs in tier-2 (as an application script 118) and tier-3 (as an SP/UDF script 130), and is driven by user interactions with the browser 426 in tier-1. At the same time, a plurality of Lotus Script IDEs are executed by the development computer 400, wherein each IDE includes a window module 500 and a runtime module 502. The IDEs support source level debugging on the development computer, which allows users to set breakpoints, step through the source code, inspect values, and modify variables.

In the example of FIG. 5, a first window module 500 and first runtime module 502 are executed on the development computer 400 for the tier-2 application script 118, so that breakpoints can be set and variables modified. Similarly, a second window module 501 and a second runtime module 503 are executed on the development computer 400 for the tier-3 SP/UDF script 130, so that breakpoints can be set and variables modified. As the user interacts with controls in the HTML page displayed by the browser 426, the application script 118 and SP/UDF script 130 are executed and breakpoints within the scripts are triggered within the first and second window modules 500 and 501 and runtime modules 502 and 503, respectively.

Figure 6:
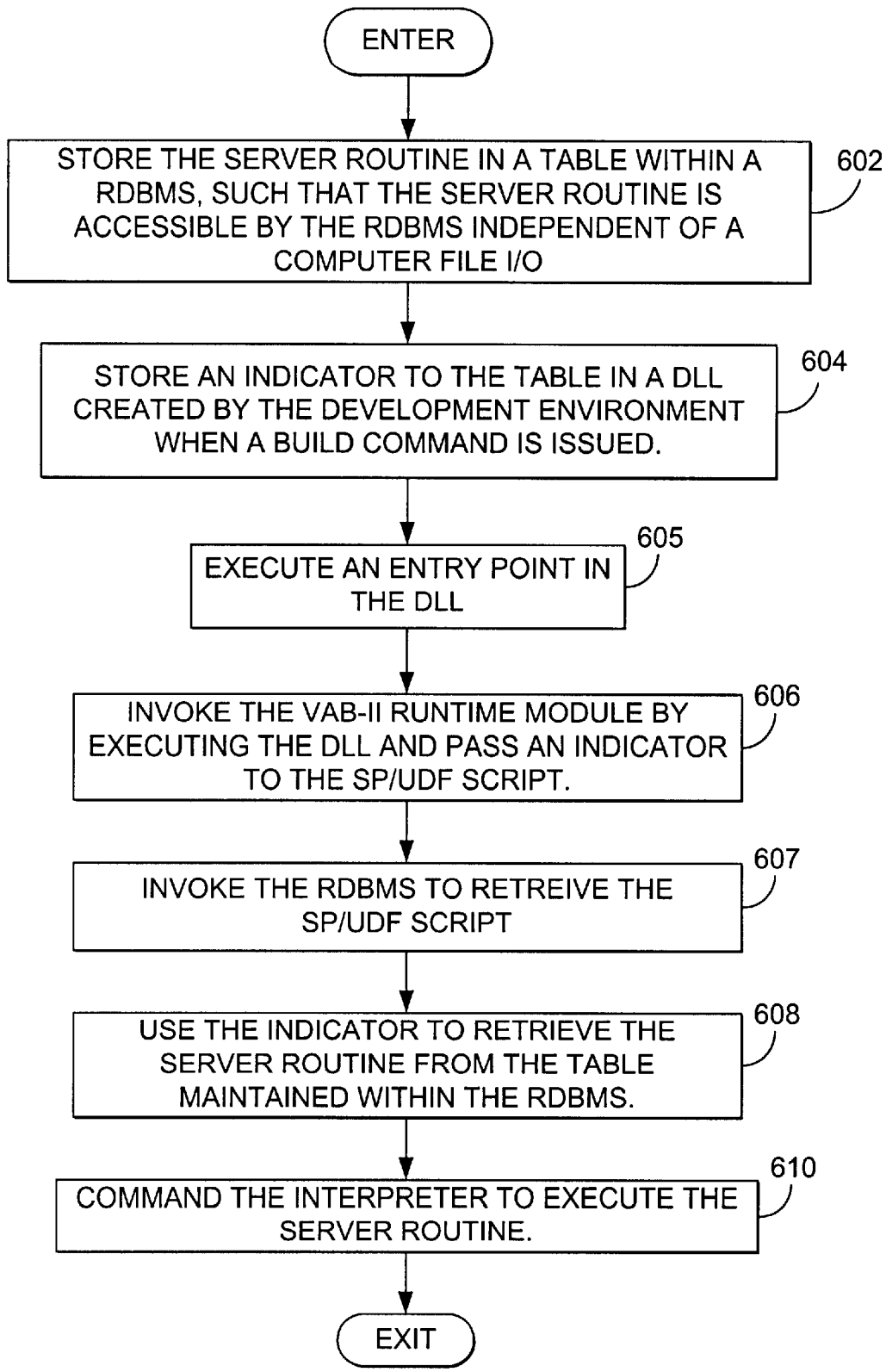
FIG. 6 is a flow chart illustrating the method steps employed in the present invention.

FIG. 6 is a flowchart illustrating the method for storing and retrieving the interpretable code within a database independent of file I/O system. When developers create a server routine, it is deployed to a database server. This is referred to as "building" the server routine. As shown in block 602, when a build command for a server routine is issued, the interpretable code for the server routine (SP/UDF script 130) is stored in a table 134 within a RDBMS 126, wherein the interpretable code is accessible by the RDBMS 126 independent of the operating system's file I/O. Next, a pointer or key (collectively referred to as an indicator) to the table 134 is stored in a dynamic link library (DLL) 138 that is created by the VAB-II runtime module 128. This is shown in block 604. Generally, a pointer refers to a variable that stores a hardware address and a key refers to a unique identifier for a row in a database table. When the server routine is called, as illustrated in block 605, the RDBMS 126 executes an entry point in the DLL 138. Then, as shown in block 606, the DLL 138 invokes the VAB-II runtime module 128 and passes the indicator to the SP/UDF script 130. Next, as shown in block 607, the VAB-II runtime module 128 invokes the RDBMS 126 to retrieve the SP/UDF script 130 using the indicator. Subsequently, as shown in block 608, RDBMS 126 uses the indicator to retrieve the SP/UDF script 130 from the table 134 without having to perform any file I/O operation. Finally, block 610 illustrates the DLL 138 commanding the interpreter 304 to execute the SP/UDF script 130.

In the present invention, the development computer 400 is intended to mimic a production environment as much as possible. The same components are used and the same logic is driven. This enables the components to be designed and implemented once, rather than implemented multiple times. It also enables the developer to have very high confidence that the testing being done reflects the actual environment in which the application will eventually run when published on multiple tiers.

Debugging prior to production (i.e., prior to when the application has been published to servers) is virtually identical to debugging in production. The same modules and structures are used. This enables developers to test scripts in a development environment that is functionally identical to the production environment.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for providing a programming development environment that supports the development of portable Internet and Intranet applications. More specifically, the present invention discloses a multitier development system that allows the development and debugging of server routines executing on multiple tiers at the same time, when the tiers are on separate machines or when the tiers are on a single machine, wherein the server routines are portable from one hardware platform to another. Also, the debugger is split into a window module and a runtime module.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of storing and executing a database server routine by a computer program executed on a computer having a file input/output (I/O) system, comprising the steps of:

storing the server routine in a table within a relational database management system (RDBMS), wherein the server routine is accessible by the RDBMS independent of the computer file I/O system and the server routine is expressed in P-code;

storing an indicator to the table in a dynamic link library derived by the computer program;

invoking the server routine by executing on entry point in the dynamic link library;

retrieving the server routine from the table via the indicator; and executing the server routine by the computer program.

2. The method of claim 1, wherein the indicator to the table is a key to the table.

3. The method of claim 1, wherein the indicator to the table is a pointer to the table.

4. The method of claim 1, wherein the server routine is a stored procedure.

5. The method of claim 1, wherein the server routine is a user defined function.

6. An apparatus for storing and executing a database server routine by a computer program, comprising:

a computer having a file I/O system;

means, performed by the computer, for storing the server routine in a table within a relational database management system (RDBMS), wherein the server routine is accessible by the RDBMS independent of the computer file input/output (I/O) system;

means, performed by the computer, for storing a key to the table in a Dynamic Link Library derived by the computer program;

means, performed by the computer, for invoking the server routine by executing an entry point in the dynamic link library;

means, performed by the computer, for retrieving the server routine from the table maintained within the RDBMS via the key; and means, performed by the computer, for executing the server routine.

7. An apparatus according to claim 6, wherein the server routine is a stored procedure.

8. An apparatus according to claim 6, wherein the server routine is a user defined function.

9. The article of manufacture of claim 8, wherein the indicator to the table is a key to the table.

10. An article of manufacture comprising a program storage medium readable by a computer and embodying one or more instructions executable by the computer to perform method steps for storing and executing a database server routine, the method comprising the steps of:

storing the server routine in a table within relational database management system (RDBMS), wherein the server routine is accessible by the RDBMS independent of the computer file input/output system and the server route is expressed in P-code;

storing an indicator to the table in a dynamic link library derived by the computer program;

invoking the server routine by executing an entry point in the dynamic link library;

retrieving the server routine from the table maintained within the RDBMS via the indicator; and executing the server routine by the computer program.

11. The method of claim 10, wherein the indicator to the table is a pointer to the table.

12. The method of claim 10, wherein the server routine is a stored procedure.

13. The method of claim 10, wherein the server routine is a user defined function.

\* \* \* \* \*

UNITED STATES PATENT AND TRADEMARK OFFICE
CERTIFICATE OF CORRECTION

PATENT NO. : 6,424,974 B1
DATED : July 23, 2002
INVENTOR(S) : Curt L. Cotner et al.

It is certified that error appears in the above-identified patent and that said Letters Patent is hereby corrected as shown below:

<u>Column 8,</u>
Line 61, after "system" insert -- and the server routine is expressed in P-codes --; and
Line 62, after "a", strike "key" and insert -- an indicator --.

<u>Column 9,</u>
Line 3, after "the" strike "key" and insert -- indicator --.
Line 17, after "within" "_" should read -- a --.

<u>Column 10,</u>
Line 3, "route" should read -- routine --.

Signed and Sealed this

Twenty-ninth Day of July, 2003

JAMES E. ROGAN
*Director of the United States Patent and Trademark Office*